United States Patent
Dalton

(10) Patent No.: US 9,191,189 B2
(45) Date of Patent: Nov. 17, 2015

(54) METHOD AND APPARATUS FOR DETECTING A PREAMBLE IN A RECEIVED RADIO SIGNAL

(71) Applicant: ANALOG DEVICES GLOBAL, Hamilton (BM)

(72) Inventor: Michael Dalton, Cork (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 14/085,443

(22) Filed: Nov. 20, 2013

(65) Prior Publication Data

US 2015/0139283 A1     May 21, 2015

(51) Int. Cl.
*H04B 1/38* (2015.01)
*H04L 7/00* (2006.01)
*H04L 27/00* (2006.01)
*H04L 7/06* (2006.01)

(52) U.S. Cl.
CPC ............... *H04L 7/0087* (2013.01); *H04B 1/38* (2013.01); *H04L 7/06* (2013.01); *H04L 27/0014* (2013.01); *H04L 2027/0036* (2013.01); *H04L 2027/0095* (2013.01)

(58) Field of Classification Search
CPC ............ H04B 7/10; H04L 1/004; H04L 1/02; H04L 27/22; H04L 7/042
USPC ........ 375/219, 259, 316, 295; 455/232.1, 230
See application file for complete search history.

(56) References Cited

U.S. PATENT DOCUMENTS

| | | | | |
|---|---|---|---|---|
| 4,506,262 A | * | 3/1985 | Vance et al. | 340/7.43 |
| 5,255,292 A | * | 10/1993 | LaRosa et al. | 375/368 |
| 5,822,373 A | * | 10/1998 | Addy | 375/259 |
| 2011/0039509 A1 | * | 2/2011 | Bruchner | 455/232.1 |
| 2012/0163480 A1 | * | 6/2012 | Nemeth et al. | 375/259 |
| 2013/0065546 A1 | * | 3/2013 | Ruijter et al. | 455/230 |

OTHER PUBLICATIONS

Analog Devices, Data Sheet for ADF7021: High Performance Narrow-Band Transceiver IC, Rev. B., Apr. 2013, 64 pages. Available at: http://www.analog.com/en/rfif-components/rfif-transceivers/adf7023/products/product.html (accessed Nov. 27, 2013).

Analog Devices, "ADF7021: High Performance Narrow-Band Transceiver IC," http://www.analog.com/en/rfif-components/rfif-transceivers/adf7021/products/product.html (accessed Nov. 27, 2013), Product Website from Nov. 2013, 4 pages.

(Continued)

*Primary Examiner* — Shuwang Liu
*Assistant Examiner* — Helene Tayong
(74) *Attorney, Agent, or Firm* — Knobbe, Martens, Olson & Bear LLP

(57) ABSTRACT

A method for detecting a preamble in a received radio signal includes demodulating the radio signal based on a carrier derived from a local timing source to provide a digital signal including a sequence of bits oscillating at approximately a modulated data rate. A bit width of each successive bit of the digital signal is determined. If a pair of consecutive bit widths has a combined width within a threshold, the bit pair is indicated as potentially belonging to a preamble. If a threshold number of potential preamble bit pairs in a sequence of bit pairs within a given window is detected, the sequence of bit pairs is indicated as potentially belonging to a preamble. A measure of bit widths of at least some bits within a sequence of preamble bit pairs can be provided and a frequency of the local timing source can be adjusted according to the measure.

21 Claims, 14 Drawing Sheets

(56) References Cited

OTHER PUBLICATIONS

Analog Devices, Data Sheet for ADF7023: High Performance, Low Power ISM Band FSK/GFSK/00K/MSK/GMSK Transceiver IC, Rev. C, Jul. 2012, 112 pages. Available at: http://www.analog.com/en/rfif-components/rfif-transceivers/adf7023/products/product.html (accessed Nov. 27, 2013).

Analog Devices, "ADF7023: High Performance, Low Power, ISM Band FSK/GFSK/OOK/MSK/GMSK Transceiver IC," http://www.analog.com/en/rfif-components/rfif-transceivers/adf7023/products/product.html (accessed Nov. 27, 2013), Product Website from Nov. 2013, 4 pages.

Texas Instruments, Data Sheet for CC1120: High-Performance RF Transceiver for Narrowband Systems, Rev. E, Oct. 4, 2013, 39 pages. Available at: http://www.ti.com/product/cc1120 (accessed Nov. 27, 2013).

Texas Instruments, "CC1120: High-Performance RF Transceiver for Narrowband Systems," http://www.ti.com/product/cc1120 (accessed Nov. 27, 2013), Product Website from Nov. 2013, 4 pages.

Stefanov, et al. "Application Note AN121: Wireless M-Bus Implementation with CC112x / CC120x High Performance Transceiver Family," Feb. 2, 2013, 50 pages. Available from: http://www.ti.com/product/cc1121 (accessed Nov. 27, 2013).

Texas Instruments, "CC112X/CC1175 Low-Power High Performance Sub-1 GHz RF Transceivers/Transmitter," User's Guide. Rev. E, Sep. 26, 2013, 111 pages. Available from: http://www.ti.com/product/cc1121 (accessed Nov. 27, 2013).

Johnsrud, "CC112x/CC120x RX Sniff Mode," Application Report, Rev. A, Oct. 9, 2013, 28 pages. Available from: http://www.ti.com/product/cc1121 (accessed Nov. 27, 2013).

Norin et al. "CC112x/CC120x RX Sniff Mode With SmartPreamble," Application Report, Oct. 23, 2013, 10 pages. Available from: http://www.ti.com/product/cc1121 (accessed Nov. 27, 2013).

Texas Instruments, CC1121, "High-Performance Low-Power RF Transceiver," Jun. 2011, revised Oct. 2013. 36 pages. Available from: http://www.ti.com/product/cc1121 (accessed Nov. 27, 2013).

Texas Instruments, "CC1121: High-Performance Low Power RF Transceiver," http://www.ti.com/product/cc1121 (accessed Nov. 27, 2013), Product Website from Nov. 2013, 4 pages.

* cited by examiner

METHOD AND APPARATUS FOR DETECTING A PREAMBLE IN A RECEIVED RADIO SIGNAL

FIELD

The present invention relates to a method and apparatus for detecting a preamble in a received radio signal.

BACKGROUND

In wireless systems, high frequency carrier signals are typically employed to carry relatively low frequency modulated packet data signals between a transmitter and a receiver. A mismatch in carrier frequencies can exist between the transmitter and receiver due to differences in local timing sources being employed by each of the transmitter and receiver. If uncorrected, this mismatch can result in poor receiver sensitivity and loss of packet data.

By way of example, the Wireless M-Bus (wM-Bus) standard (EN13757-4:2005 and 2012) specifies the radio frequency (RF) communication link between water, gas, heat, and electric meters and data collecting devices and is becoming widely accepted in Europe for smart metering or Advanced Metering Infrastructure (AMI) applications. Other applications for wM-Bus include alarm systems, flexible illumination installations, heating control, etc. Mode N of the wM-Bus specification has two use cases, 2.4 kbps and 4.8 kbps, and the standard outlines a frequency error tolerance requirement of +/−2kHz and +/−1.5kHz, respectively, for these data rates, i.e. the receiver/transmitter must be capable of communicating in spite of a 1.5/2 kHz difference in their respective reference frequencies.

At the same time, the wM-Bus mode N standard specifies a signal format comprising a relatively short preamble of 2 bytes and a 1 byte Synch Word (F6) to identify incoming data.

Within RF receiver modules, Automatic Frequency Correction (AFC) is carried out on a received signal to correct frequency mismatch between transmitter and receiver, typically during the preamble stage of a packet signal.

Clock and Data Recovery (CDR) is carried out to generate a receive clock and to ensure that received data bits are being sampled as near as possible to the centre of each bit, as this should ensure the best possible Signal to Noise Ratio (SNR) of the received bit.

For optimum performance, AFC and CDR should be settled before the data portion of a packet arrives. This can be challenging in systems using a short preamble, for example, the receiver sections of transceivers handing wM-Bus mode N signals.

SUMMARY

Methods for detecting a preamble in a received radio signal are provided. One such method comprises demodulating a received radio signal based on a carrier derived from a local timing source to provide a digital signal comprising a sequence of bits oscillating at approximately a modulated data rate. A bit width of each successive bit of the digital signal is determined. If a pair of consecutive bit widths has a combined width within a threshold value, the bit pair is indicated as potentially belonging to a preamble. If a threshold number of potential preamble bit pairs in a sequence of bit pairs within a given window is detected, the sequence of bit pairs is indicated as potentially comprising a preamble.

A statistical characteristic of at least some of said sequence of bits potentially comprising a preamble can be determined; and responsive to the statistical characteristic meeting a predefined criterion, the bit sequence can be confirmed as comprising a preamble.

A measure of bit widths of at least some bits within a sequence of preamble bit pairs can be provided and a frequency of the local timing source can be adjusted according to said measure.

Further aspects provide a radio receiver module configured to perform the above methods.

Alternative aspects provide an adaptor module configured to perform the above methods.

Still further aspects provide a transceiver module including a radio receiver module according to embodiments of the present invention.

Once a preamble has been detected, a centre of subsequent bits can be located enabling otherwise conventional clock and data recovery (CDR) to be performed on the demodulated signal.

Embodiments of the present invention provide preamble detection which enables AFC and CDR settling on 2FSK/2GFSK/MSK modulated received signals containing a frequency error using as little as 16 bits of preamble.

Embodiments of the invention can provide a one-time adjustment of a carrier frequency and so can be implemented rationally and with little processor overhead or latency.

BRIEF DESCRIPTION OF THE DRAWINGS

Embodiments of the invention will now be described, by way of example, with reference to the accompanying drawings, in which.

DESCRIPTION OF PREFERRED EMBODIMENTS

Embodiments of the invention provide a module which receives a demodulated digital signal and which analyzes successive bit widths of demodulated data to search for patterns in the data in order to detect what might be a relatively short preamble, for example, of the order of 16 bits in length. Preamble detection can be challenging in systems using a relatively short preamble, for example, the receiver sections of transceivers handing wM-Bus mode N signals. Once a preamble is detected, the receiver can calculate a carrier frequency error, correct the frequency error and then proceed to recover a clock and sample a received signal at the optimum point of the received data.

Figure 1:
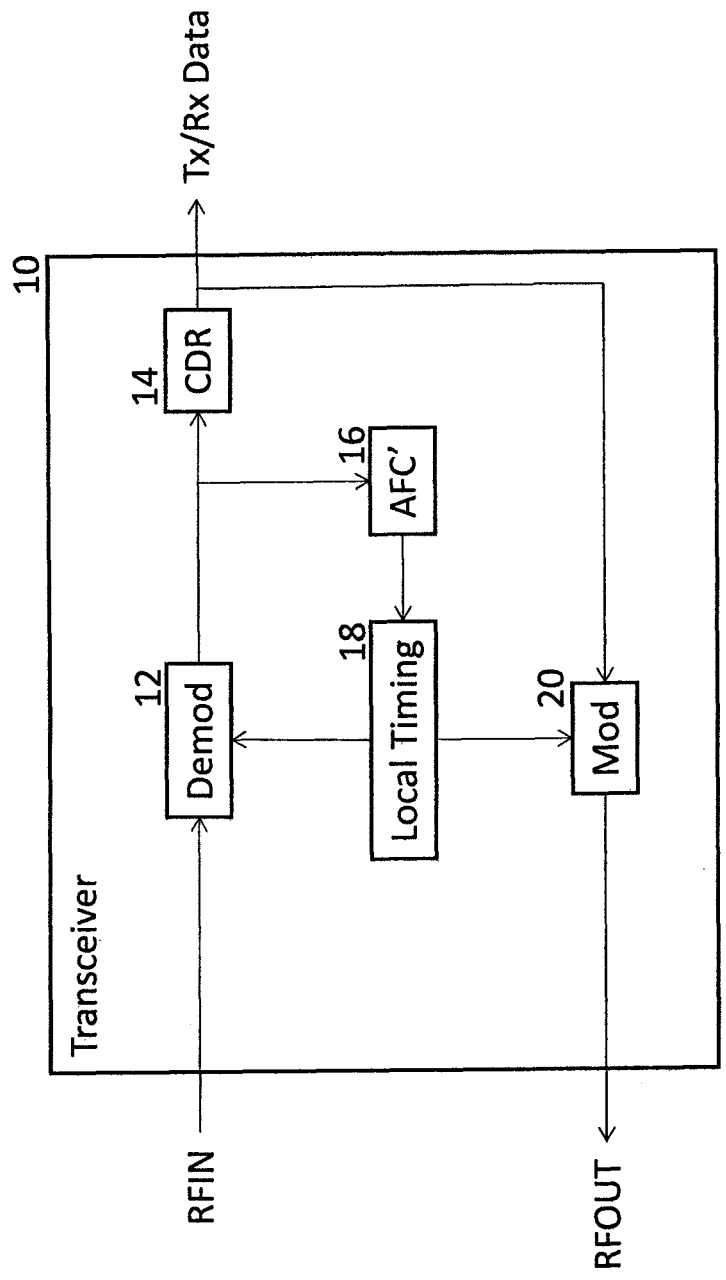
FIG. 1 is a high level block diagram illustrating an embodiment of the present invention.

FIG. 1 illustrates schematically a transceiver 10 according to an embodiment of the present invention. An RF signal comprising a high frequency carrier signal on which a low frequency data signal is modulated and fed via an RFIN port to a demodulator 12. The demodulator 12 provides a low frequency demodulated digital data signal. When no data signal at RFIN is being received, this digital signal can be noisy and produces a sequence of bits of randomly varying width. At some stage, a remote device begins by transmitting a preamble comprising a known sequence of bits. In some cases, this can be followed by a synchronization word, a specific packet of data signalling the beginning of a data transmission, and then the data payload. If however, there is a frequency mismatch between the local timing source 18 and the timing source for the transmitter (not shown), then the preamble and subsequent data may not be detected and recognized within the demodulated signal.

Within the transceiver 10, the demodulated digital signal is fed to an Automatic Frequency Correction (AFC') block 16 which detects the preamble and can make any desired adjustment to the local timing source 18 before the data portion of the RF signal is received. Once any timing adjustment has been performed, demodulated data fed to a clock and data recovery (CDR) block 14 can be processed normally to provide receive data Rx Data.

Typically, this functionality is implemented in a transceiver where the local timing source 18 is also used to modulate transmit data Tx Data in a modulator 20 before it is transmitted via an RFOUT port.

Figure 2:
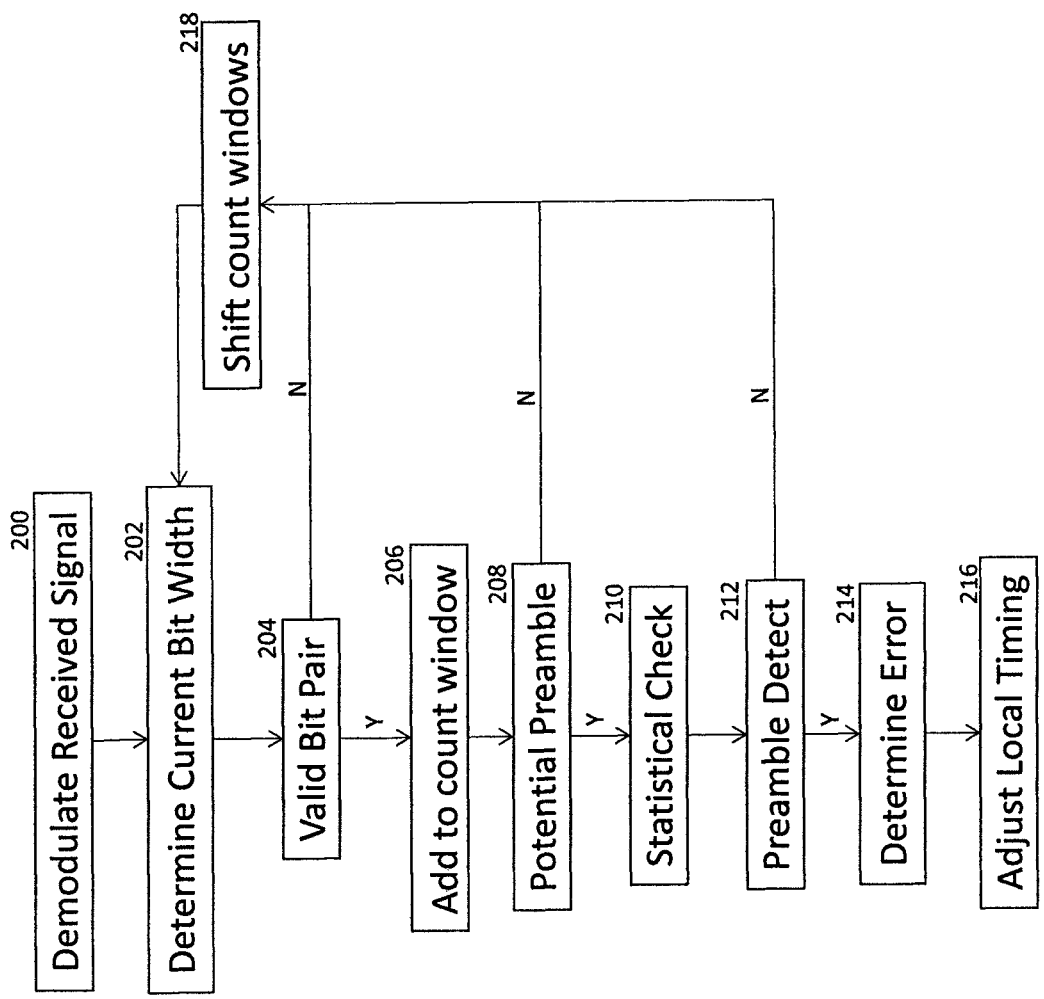
FIG. 2 is a flow diagram illustrating an embodiment of the present invention.

The AFC' block 16 of FIG. 1 can implement the functions illustrated in FIG. 2. Similarly, the AFC' 108 and/or the AFC' 300 illustrated in FIG. 3 can implement any combination of features of the method of FIG. 2. At operation 200, the AFC' block 16 can receive the demodulated digital signal comprising a sequence of alternating bits of various widths. A bit width is determined for a current bit at operation 202. The combined width of a pair comprising the current bit and an adjacent bit is compared to a nominal amount (plus or minus a threshold) to determine if the combined width is within a valid range at operation 204. If so, the pair is added to a preamble count window and bit widths for the pair are saved in a memory (not shown) accessible to the AFC' block 16 at operation 206. If a specified number of pairs have been detected within the count window, a potential preamble is flagged at operation 208. A statistical check can be performed at operation 210 to determine if the bit widths of the preamble fulfill a statistical criterion and, if so, a preamble is confirmed at operation 212. If a valid preamble is detected, a frequency error can then be determined based on the bit widths of the bits comprising the preamble at operation 214. The local timing source 18 can be adjusted to take into account any difference between transmitter and receiver timing at operation 216. If any of the tests of operations 204, 208 or 212 fails, processing advances to analyze the next successive bit and bit pair including shuffling the count window and bit width data, at operation 218, to remove old data.

Figure 3:
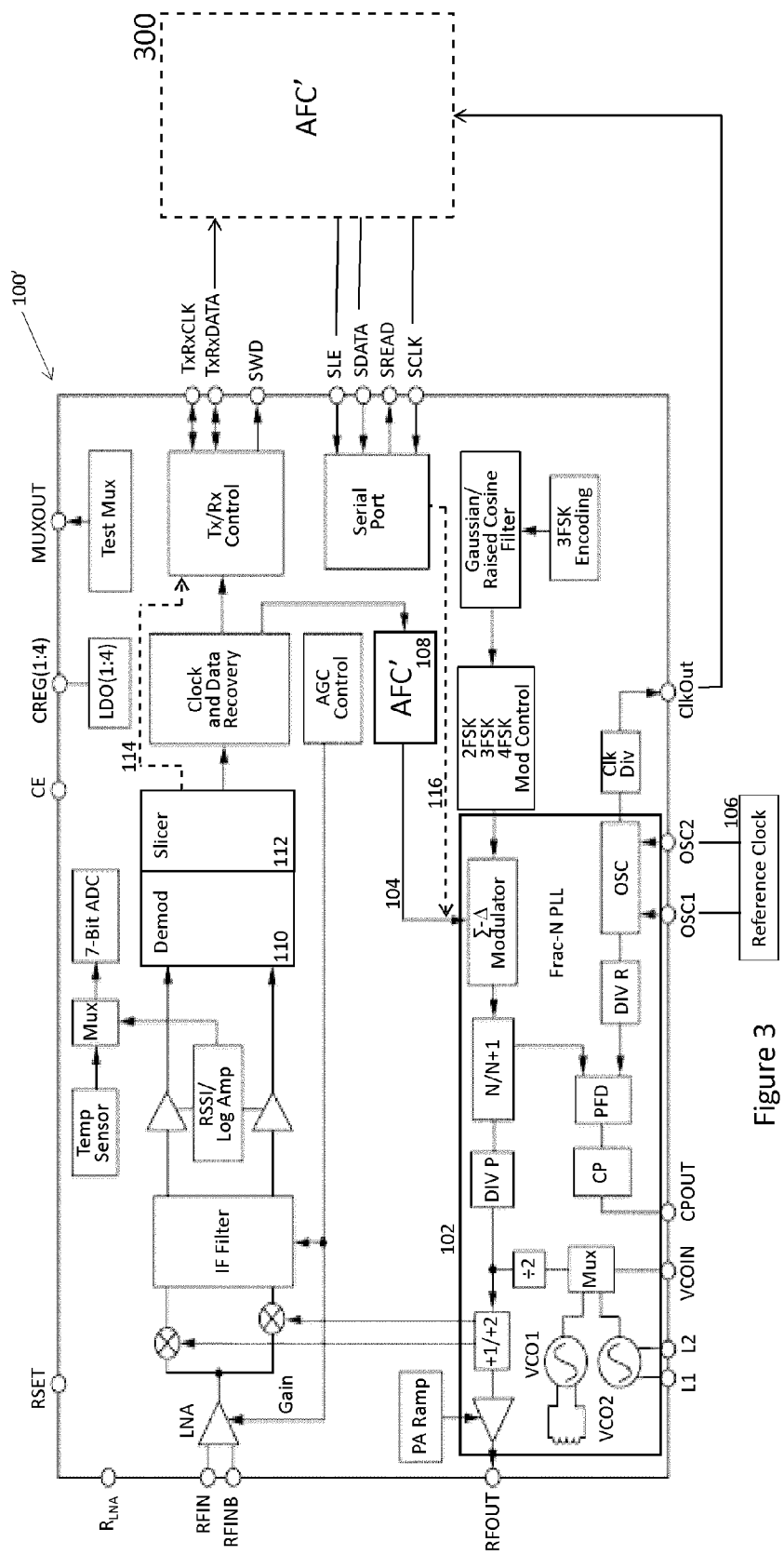
FIG. 3 is a more detailed block diagram of a transceiver module for processing a received radio signal along with an adaptor module according to respective embodiments of the present invention.

Referring FIG. 3, a transceiver module 100' according to one embodiment of the present invention is implemented by updating the functionality of the AFC block in a transceiver such as the ADF7021™ narrow band transceiver, commercially available from Analog Devices, Inc. (Norwood, Mass.).

The ADF7021™ transceiver includes AFC and CDR blocks. The AFC block on the ADF7021™ uses an envelope detector to estimate any frequency error. This detector employs approximately 48 bits of preamble to accurately estimate and correct the frequency error of the received signal. After AFC has settled, the CDR block subsequently employs 16 additional bits of preamble to consistently acquire the center of a bit. Thus, the ADF7021™ typically entails 64 bits of preamble to correct and recover a signal containing a frequency error and as such would be unsuitable for wM-Bus mode N applications.

The functionality that the transceiver of FIG. 3 and the ADF7021™ have in common will not be described in detail in the present specification.

Referring back to FIG. 3, the transceiver 100' includes a programmable fractional-N phase locked loop (PLL) module 102 including oscillators VCO1 and VCO2. The fractional-N PLL 102 is driven from an external reference clock 106. For receiving data, the fractional-N PLL 102 is programmable by the AFC' block 108 with internal device commands across an internal bus 104.

In one embodiment of the present invention, the AFC and CDR blocks of the transceiver 100' are configured to detect a preamble and determine the adjustment desired to the oscillation frequency of the oscillators VCO1 and/or VCO2 so that the receiver portion of the transceiver is matched to the transmitting frequency of a device from which an RF signal (RFIN) is received. Such features can be implemented in combination with features of a variety of different types of receivers, such as the ADF7021™, sold by Analog Devices, Inc. or like transceivers.

While some embodiments are described with reference to a receive side of the transceiver for illustrative purposes, it will be appreciated that the adjusted frequency could also be used when transmitting an RF signal (RFOUT) to a remote device. Where one device including the transceiver 100' communicates with several different remote devices, it could use adjustments calibrated for each remote device, stored in on-board and/or off-board memory (not shown), and specifically adjust its transmitting frequency according to a target remote device. In this case, the command to adjust the frequency of the fractional-N PLL 102 can be received by the transceiver 100' via the serial port command interface (SDATA, SCLK, SLE) and relayed internally to the fractional-N PLL 102. The transceiver 100' could also be expanded to integrate such functionality. Such an embodiment is particularly useful where the transceiver is included in a base station communicating with a number of client devices, as it allows client devices to be implemented more cheaply without high accuracy reference crystals because the signals they receive from the base station can be tuned specifically for each device.

Alternatively, the transceiver 100' might simply use its own reference frequency derived from the reference clock 106 and rely on remote receiving devices to adjust their receiving frequencies when they are processing received signals. The remote receiving devices can adjust their receiving frequencies, for example, using the principles and advantages described herein.

The embodiment illustrated in FIG. 3 can carry out preamble detection, AFC and CDR on a received wM-Bus mode N type modulated signal containing 16 bits of preamble. In this case, the preamble sequence is a continuous 1010 sequence, typical of low data rate sub-GHz applications. However, it will be appreciated that variants of the embodiment can be implemented to operate with even shorter or longer preambles or preambles with different bit sequences and in non wM-Bus applications.

Figure 4:
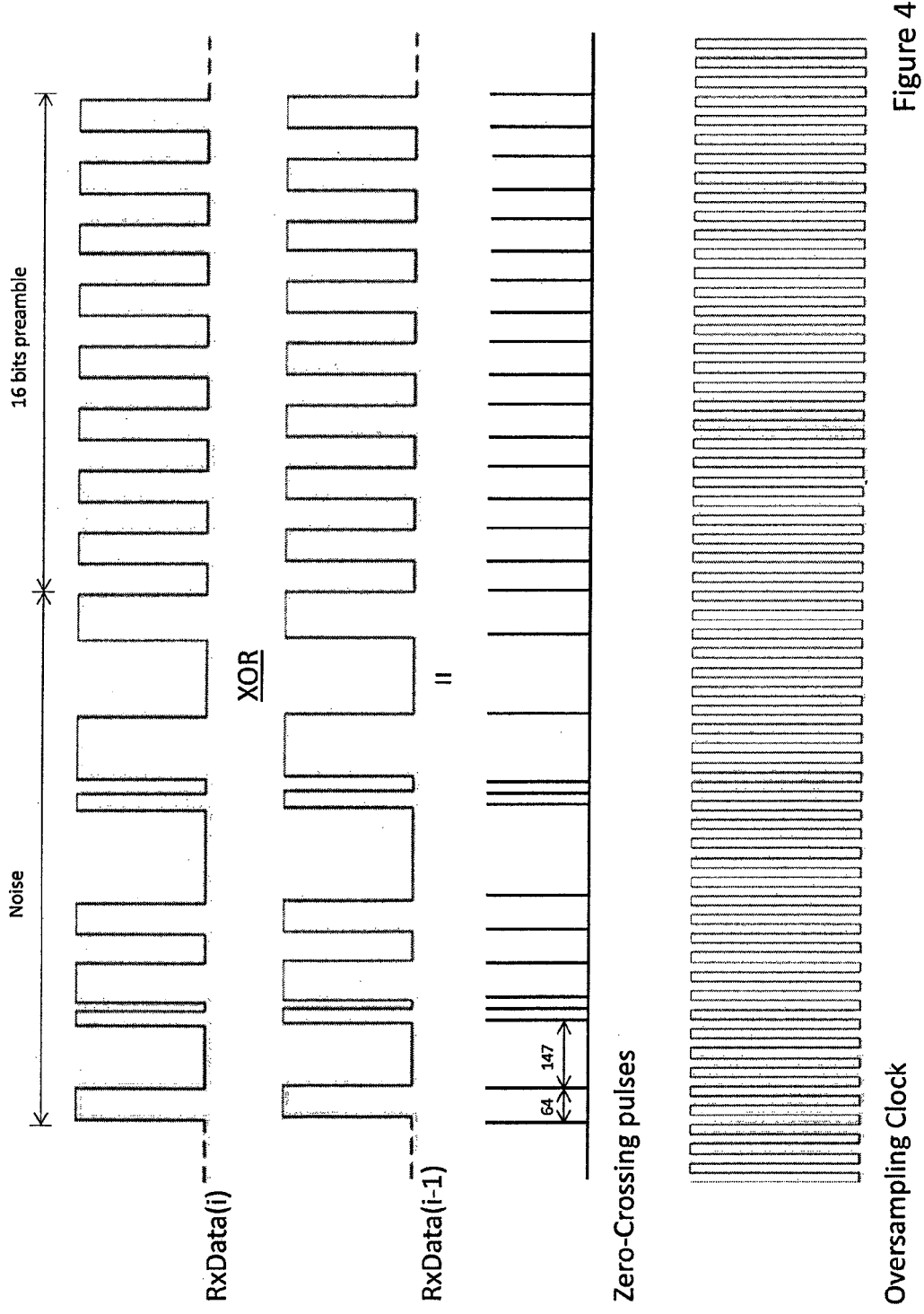
FIG. 4 illustrates some signals employed in illustrative embodiments of the present invention.

FIG. 4 shows some signals employed within embodiments of the present invention. In FIG. 3, the front end demodulator 110, provides an analog signal extracted from the received high frequency RF signal. This analog signal represents the transmitted bit stream with a frequency approximately equal to the modulated data rate. It will be appreciated that this signal can be relatively noisy under low SNR conditions. The analog signal from the demodulator 110 is fed to a slicer 112, which is set with a threshold DC voltage. Signals above the threshold level are set to 1 and below, set to 0 to provide a binary level signal. The digital signal is then oversampled, typically at 32× or 64×, with a clock, again derived from reference clock 106, to provide a sequence of received data, RxData, which is employed by the AFC' block 108 to identify a preamble and adjust local timing for received data.

Thus the output from the slicer 112 has been sliced about a fixed DC point to generate 2 discrete levels. A transition between these levels is known as a zero-crossing point. The mark-space-ratio (MSR) is the ratio of the width of a consecutive one-zero sequence. A signal with no frequency error will output a 1010 data sequence from an ideal demodulator with a MSR of 50:50. When a frequency error is present on the RF carrier signal, the MSR will deviate from 50:50, as will be illustrated later.

In embodiments of the present invention, preamble detection is implemented digitally by oversampling the demodulator output with a high frequency clock (relative to the data rate) derived from the reference clock and storing the width of each received bit in a memory (not shown). A bit width is the number of oversampled clock cycles between each zero-crossing of the received data. Preamble detection involves searching for patterns in the bit widths of the oversampled data. When a signal is received with zero frequency error, the bit widths will equal (1/data rate)*(oversampling clock rate).

A series of consecutive bit widths corresponding to the expected data rate can then be used to discriminate between a valid preamble signal and noise, with a relatively high degree of confidence.

It should be noted however, that:
1) Individual preamble bit widths may not correspond with the data rate in the presence of a frequency error as the MSR should not be 50:50.
2) Noise and imperfections in the analog receive chain may distort the preamble bit widths from their expected values.

In embodiments of the invention described in more detail below, preamble detection searches for patterns in pairs of bit widths, as in an ideal receiver, the total width of 2 consecutive bits will equal (1/data rate)*(oversampling clock rate*2), even in the presence of a frequency error.

In embodiments, the criteria for a valid pair of bit widths are relaxed to an extent, while ensuring a low false preamble detect rate, as false preamble detects can lock the part up for a fixed length of time and in this time, a valid preamble signal may be missed resulting in a packet error.

In various embodiments of the present invention, the following can be employed:
a) Ranges (max/min thresholds) in the check for two consecutive preamble bit widths;
b) A sliding preamble count window which looks for a qualifying number of valid preamble bit width pairs in a fixed window length; and
c) A statistical check of the bit widths which indicates valid preamble bit pairs in the sliding window.

These features allow for significant noise to be accommodated while ensuring a low false preamble detect rate.

FIGS. 4 to 7 illustrate signals and signal processing that can be implemented by the new transceivers described herein. For instance, the AFC' 16 of FIG. 1, the AFC' 108 of FIG. 3, the AFC' 300 of FIG. 3, or any combination thereof can process the signals shown in these figures and implement the functionalities described in reference to these figures.

Referring again to FIG. 4, one technique for measuring the bit widths of the received signals is to exclusive OR (XOR) the demodulated signal RxData with a 1-bit (of the oversampling clock) delayed version of itself. This produces "zero-crossing pulses" and the number of sampling clock cycles between each pulse is used in the detection of a preamble signal. It will be appreciated that while the present example is described with an oversampling clock running at 64 times the data rate, this can be varied, and that the oversampling signal shown in FIG. 4 is illustrative only and is not in fact shown at 64× the data rate of RxData.

Turning now to FIG. 5(*a*), it will be seen that the sum of the bit widths of the current pair of bits within a noisy signal, being 64+147 are outside the ideal bit width threshold of 128±8 and so they are ignored as a potential preamble pair. Again, in FIG. 5(*b*), where the sliding window has moved on 1 (potential) preamble bit, the same is true of the next bit pair. Processing continues and it will be seen in FIG. 5(*c*), that one bit pair within a noisy sequence actually falls within the potential preamble bit pair width threshold. As such, the width data for each of the one and zero bit of this pair is stored in memory as shown, but without the criteria for a valid preamble being satisfied.

In this example, processing continues until the bit pair shown in FIG. 5(*d*), where in spite of another bit pair (107, 29) within the noisy sequence being flagged as a potential preamble bit, the beginning of the preamble starts. FIG. 5(*e*) shows the receipt and recordal of the first bit from the actual preamble and so on until FIG. 5(*f*). At this stage, a total of 8 bit pairs have been detected within the preamble count window and the arrows connecting the RxData signal to the preamble count window indicate the occurrence of some of these bit pairs. The arrows connecting the preamble count window to the one width memory indicate the bit widths detected from these preamble pairs. The preamble count window is set to 16 and the qualifying count to 8. This means that a sequence as short as 9 bits forming valid bit pairs could register as a potentially valid preamble. Clearly, the qualifying count could be increased up to the length of the preamble count window, 16, to implement the most rigorous preamble detect. The maximum length of the preamble count window is the length of actual preamble which is to be detected, but clearly this could also be shorter than 16 to provide different detection criteria.

Once a qualifying number of potential preamble bit pairs have been detected as at FIG. 5(*f*), preamble detection begins to analyse the statistical characteristics for the stored bit pairs. In this embodiment, the variance of the recorded bit widths for 1 s and separately the variance for the recorded bit widths of 0s is measured as follows:

$$\text{variance} = \frac{1}{n} \sum_{i=1}^{n} (y_i - \bar{y})^2$$

While in this example, at this stage, the zero bit widths fulfil the variance criterion, being below a threshold of 200, the one bit widths do not and so processing continues. Subsequently, as each successive valid bit pair of the preamble is received, data for the oldest bit pairs is shifted out of both the preamble count window and bit width memories.

It will be appreciated that any statistical check or combination of checks can be employed at this stage to verify that the bit pairs detected form a valid preamble.

As shown in FIG. 5(*g*), the preamble bit count and statistical properties are eventually met at point A.

On reception of a valid sequence of preamble bits, the frequency error of the received signal preamble can be calculated from the MSR of the preamble bits and the timing of the local receiver adjusted accordingly.

In the example, an average of the last x<8 preamble bit widths is taken as a single measure of preamble bit width. In the example of FIGS. 5(a)-5(g), the bit width measure indicates that no adjustment of the factional-N PLL 102 (FIG. 3) is desired —as expected.

As indicated above, AFC where desired is executed by writing to the fractional-N PLL register. There is a variable delay $\tau$ between the zero-crossing where a valid preamble was detected (Point A in FIG. 5(g)) and the time where the fractional-N write is executed. This is due to the delay between clocking bits to memory and analysing them. Typically, $\tau$ can vary from 0 up to 1 data bit period without causing a problem.

Figure 5A:
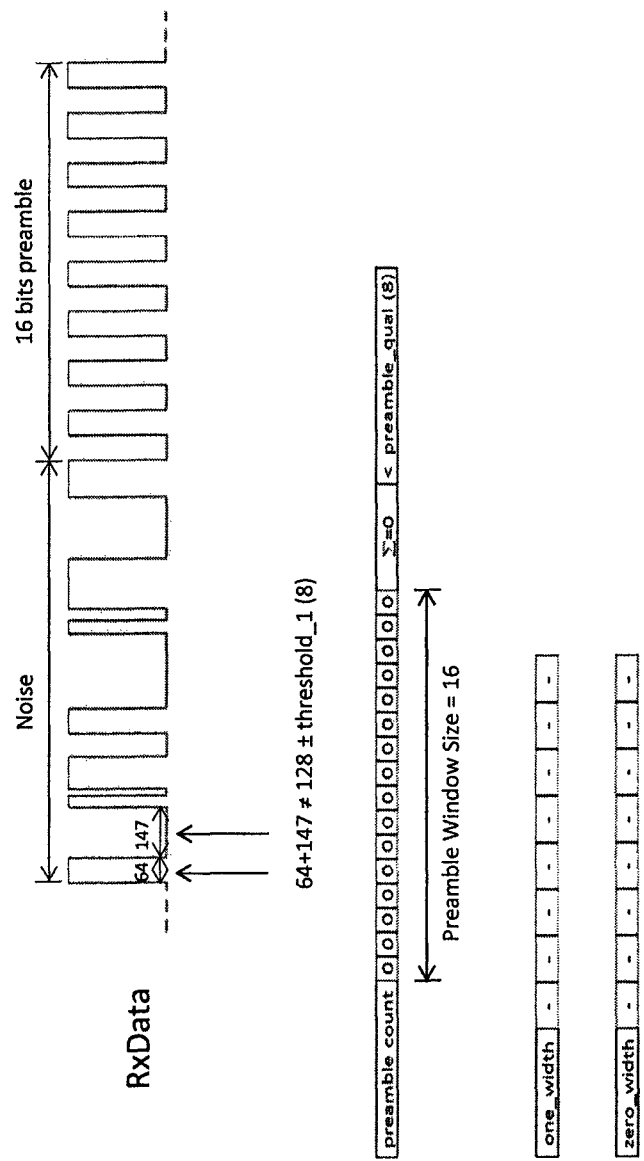
FIGS. 5(a) to 5(g) illustrate the processing of a received signal without a frequency error in accordance with an embodiment of the present invention.
Figure 5B:
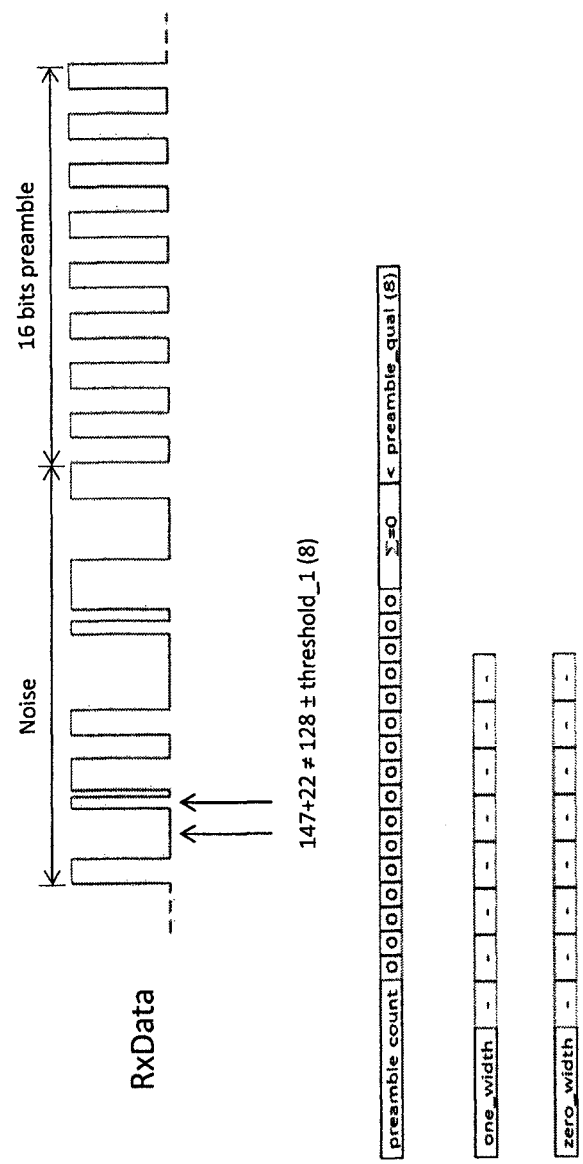
Figure 5C:
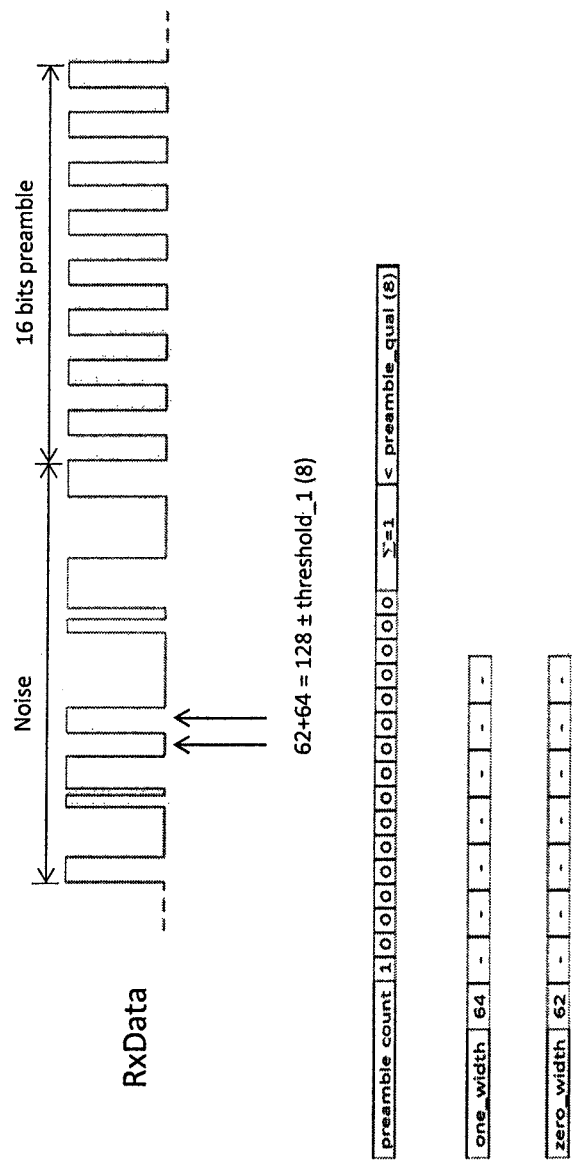
Figure 5D:
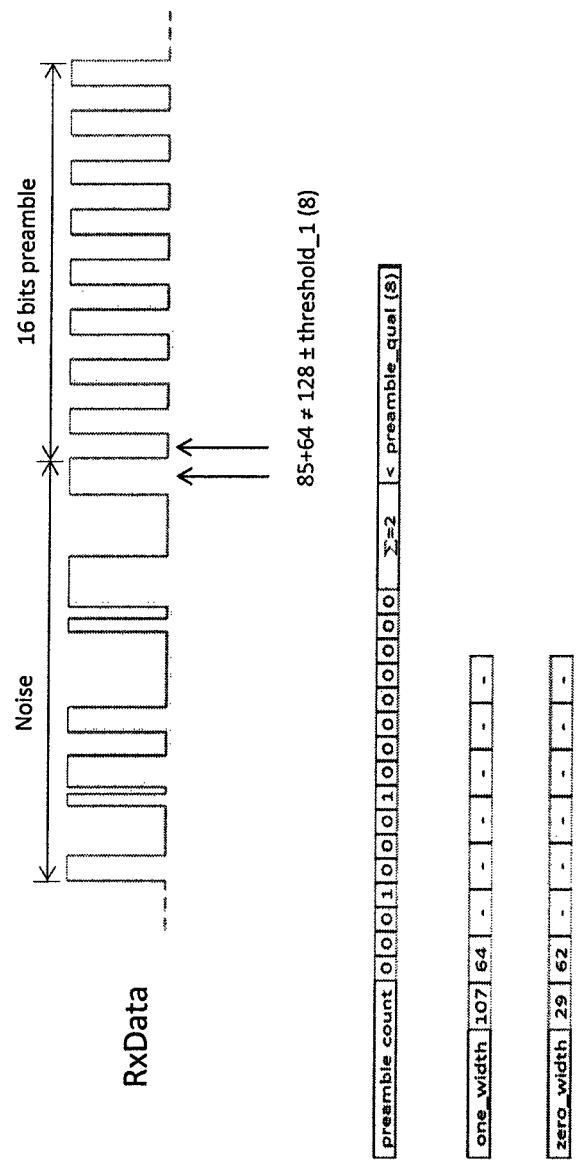
Figure 5E:
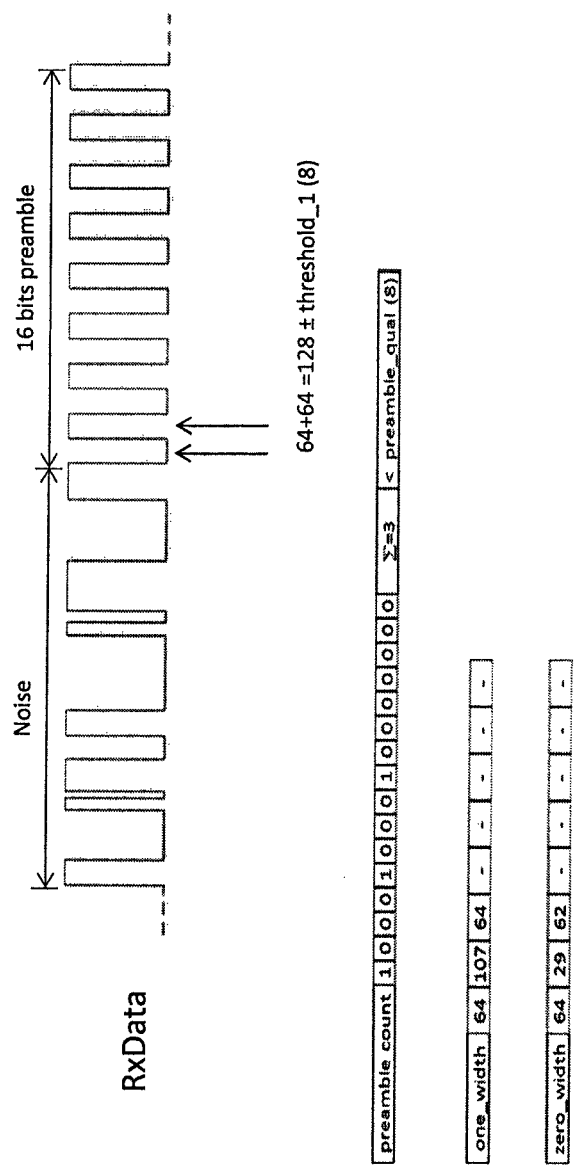
Figure 5F:
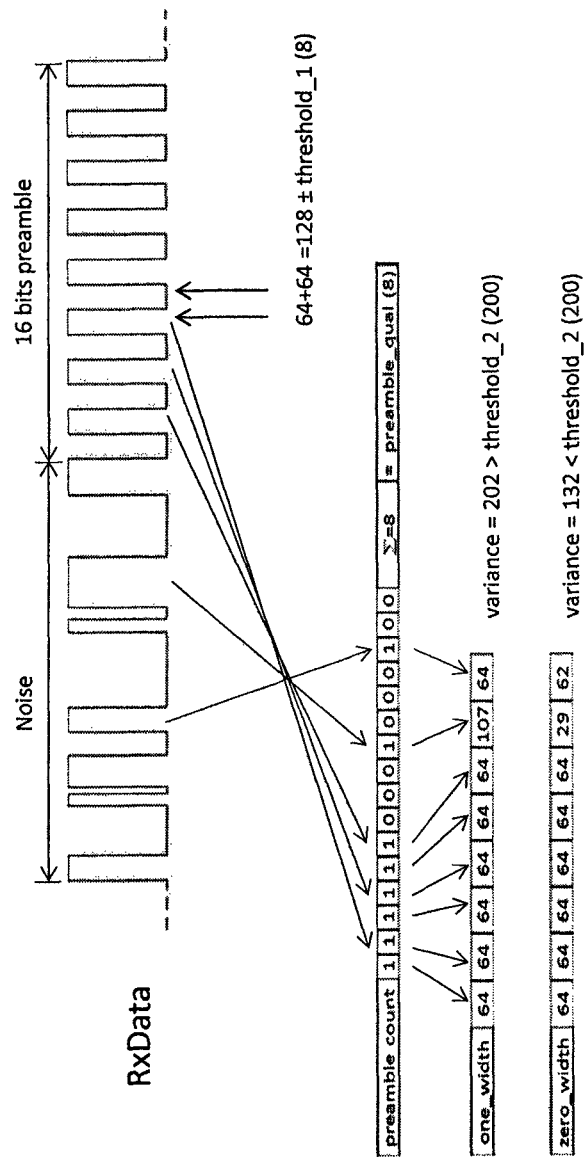
Figure 5G:
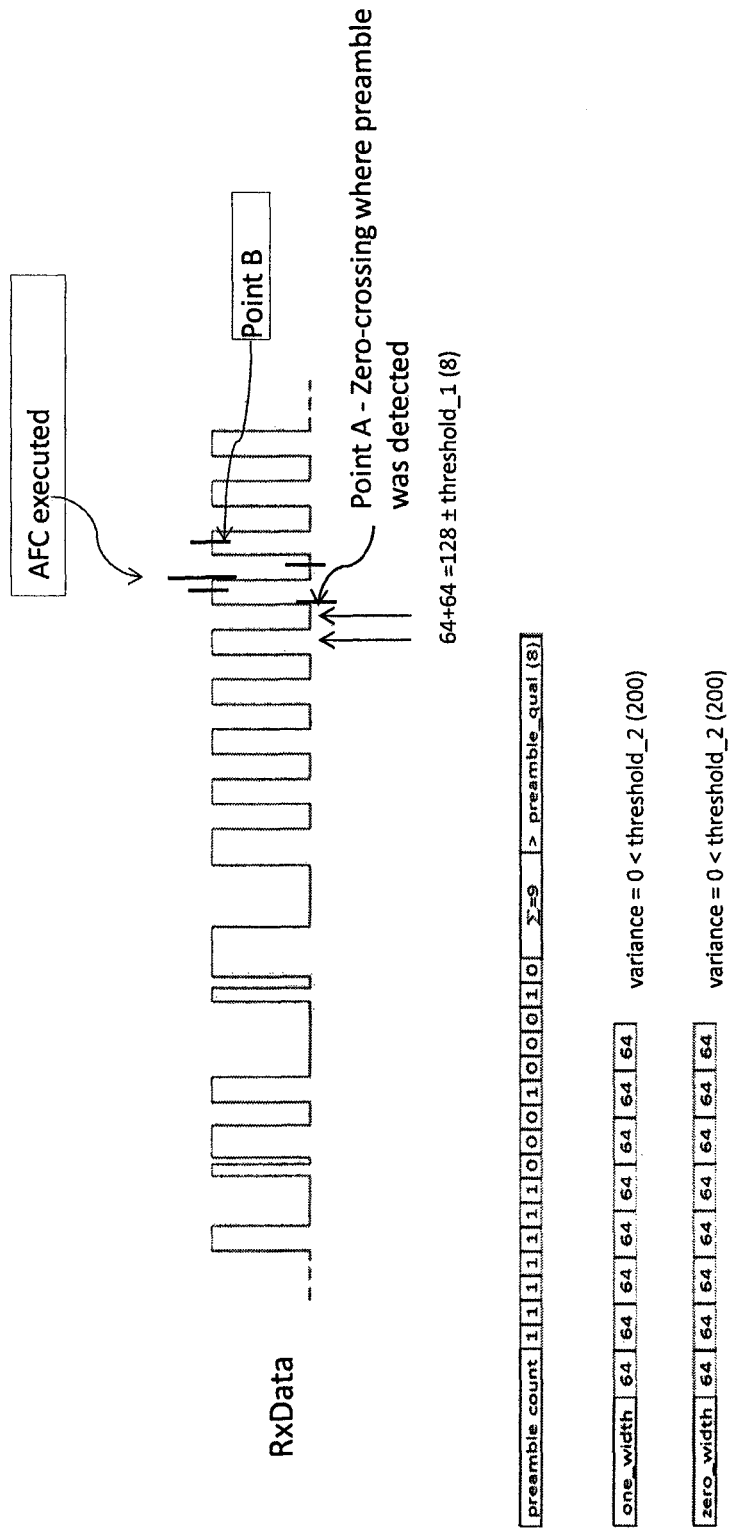

In the embodiment, Point B shown in FIG. 5(g) is the first point where adjustments are made by the CDR block in response to subsequent zero-crossings.

The location of the centre of the bit is estimated as Point A+(measured bit width/2).

It can be useful to ensure that enough time has passed to allow the local oscillator to settle following AFC, for example, by waiting until after the first 2 sampling points to adjust CDR. (This can vary from receiver to receiver). As such, in some embodiments, CDR would only adjust the sampling point based on the location of zero-crossings from Point B onwards.

Figure 6A:
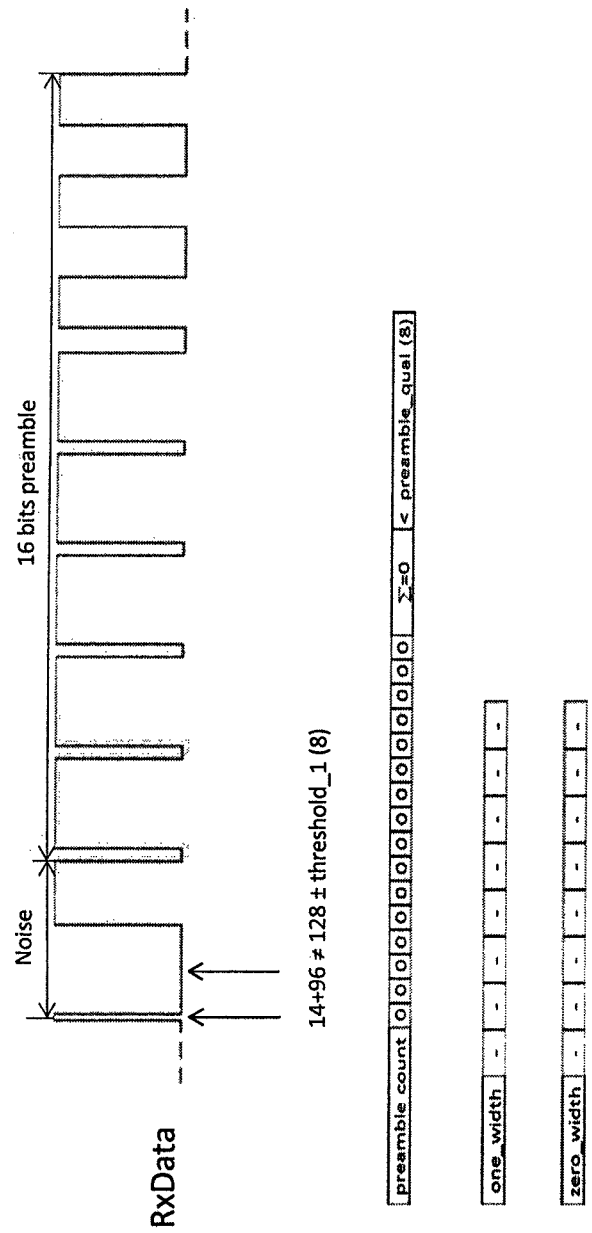
FIGS. 6(a) and 6(b) illustrate the processing of a second received signal including a frequency error in accordance with an embodiment of the present invention.
Figure 6B:
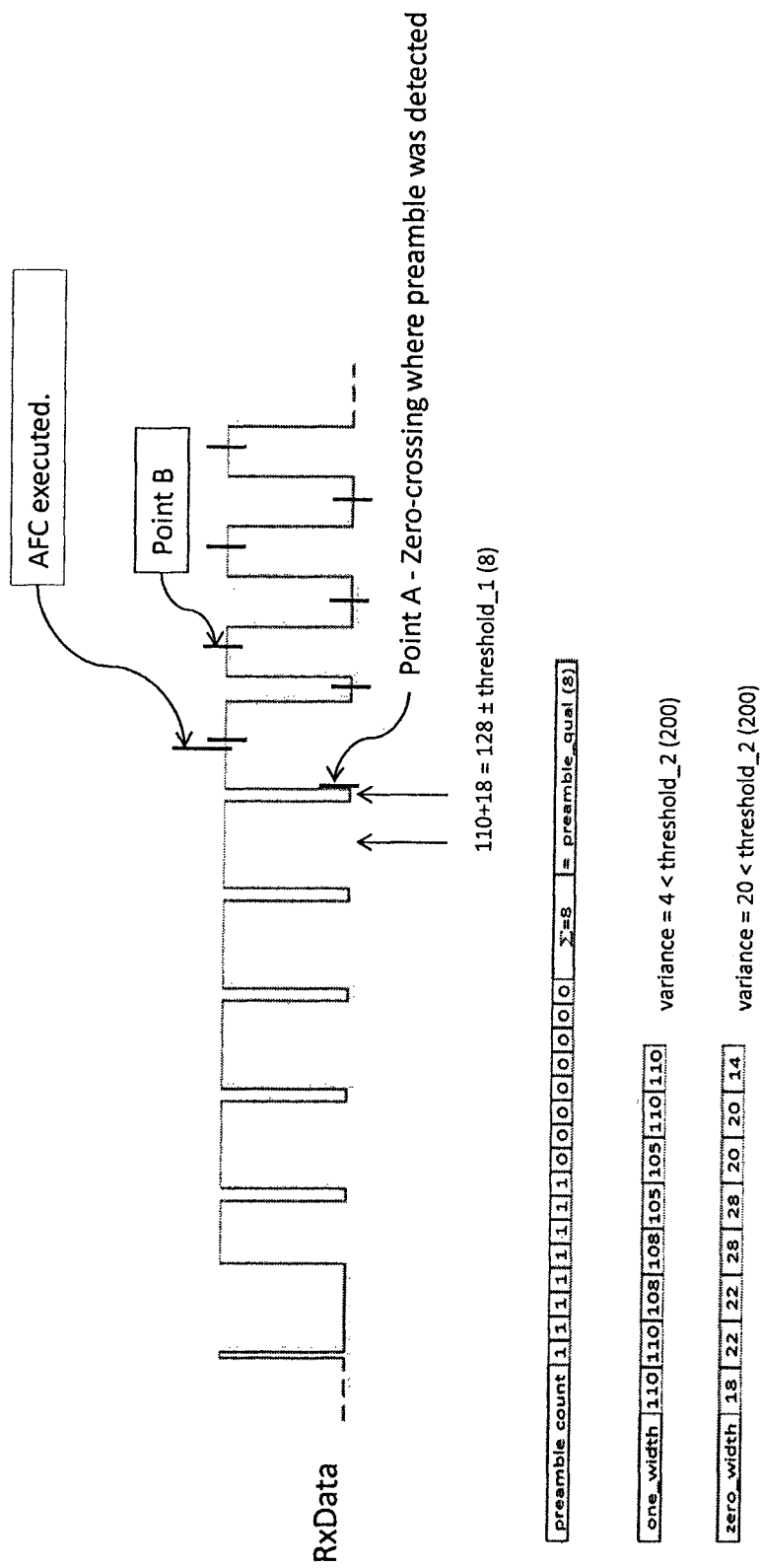

Referring now to FIG. 6(a) where a demodulated signal derived from a high power (good quality) signal incorporating +1.4 kHz frequency error is shown. In this case, processing has advanced almost as far as the preamble and no potential preamble bits have been identified. In FIG. 6(b), processing has advanced to the point where the specified number, 8, of potential preamble bits have been counted within the preamble count window and each of the one and zero sets of bit widths meet the specified variance threshold.

In this case, however, the recorded bit widths indicate a frequency error. The extent of the frequency error and the correction desired are calculated as follows:

A measure of the one bit widths, Length, is taken, for example, by averaging the widths of the last x<8 preamble bits to be detected. In this case, the average Length=109.

In this case, the relationship between Length and frequency error is assumed to be linear, and the frequency error in this case is calculated as:

$$\text{Error} = A \times \text{Length} - B = 1.35 \text{ kHz}$$

A and B can be calculated empirically by characterizing the receiver and in one example, A=30 and B=1920. Clearly, for different receivers different relationships between Length and frequency error might apply.

In the present example, the adjustment of the fractional-N PLL 102 (FIG. 3) can then the calculated as:

$$\text{Error}/\text{Min}PLL\text{step} = 1350/150 = 9$$

Again, the relationship between the frequency error and desired adjustment to the local timing source will vary from implementation to implementation.

Again, from Point B onwards the CDR is adjusting the sampling point based on the location of the zero-crossings, as from this point it is assumed the local oscillator has settled and the zero-crossing locations reflect a MSR of 50:50 and so transmitter frequency error should have been eliminated from received data with a single adjustment of the fractional-N PLL 102 (FIG. 3).

Figure 7:
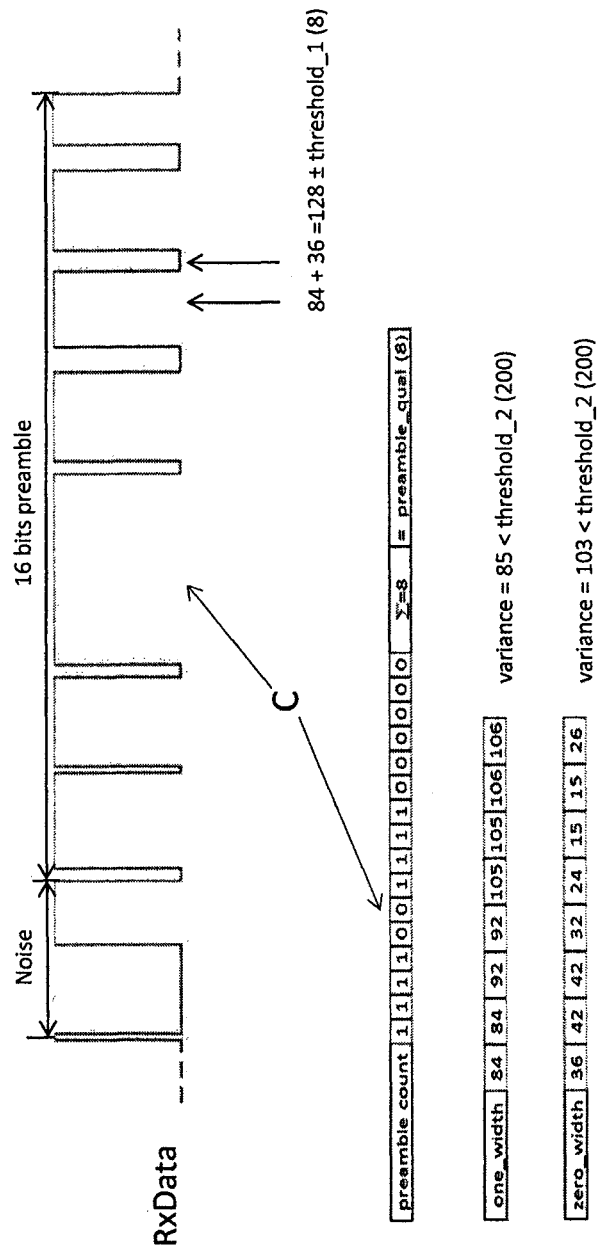
FIG. 7 illustrates the processing of a third low power received signal including a frequency error in accordance with an embodiment of the present invention.

FIG. 7 illustrates an example demodulated waveform derived from a low power (noisy or poor quality) RF input signal. In this case, a preamble cross-over at time C has been missed. As can be seen from the preamble count window and bit width memories, the bit widths for this period have not been recorded and so do not affect the final calculated frequency error.

Due to the data collected during the above described preamble detection, the expected center of subsequent data bits is known at the instant the preamble is detected and therefore the CDR has acquired lock. The center of the first bit is simply the point in time from the zero crossing which generated the preamble detect, plus (0.5*bit width) of the bit and CDR adjustment can then proceed as normal (or after two bits as explained above).

The above described embodiment has been described as being implemented in a transceiver module 100'. Referring back to FIG. 3, AFC control can alternatively or additionally be implemented external and/or off-board from the transceiver module 100' in an AFC adaptor module 300. The AFC adaptor module 300 can receive a slicer output from the slicer 112, fed via internal controls indicated as 114 to the TxRx-Data port of the transceiver module, as well as a suitably sampled version of the transceiver reference clock (CLK-OUT), which are employed by a processor within the module 300 as described above to determine the desired frequency adjustment of the transceiver clock.

The command for adjusting, for example, the fractional-N PLL 102 within the transceiver module 100' is fed back to the transceiver module 100' as a command via the serial port (SLE, SDATA, SCLK) and an internal bus 116 to adjust the on-board fractional-N PLL 102 as desired. It will be appreciated that the AFC adaptor module 300 functionality can be implemented within a dedicated module or indeed this functionality can be implemented with a more functional general purpose controller. In this case, the AFC adaptor module 300 or the general purpose controller can perform preamble detect and AFC according to the embodiments described above using a legacy device such as the ADF7021™

Still further variations of the above described embodiments are also possible, for example:

1) In preamble detection, statistical methods other than variance calculation may be employed to distinguish between a true preamble bit sequence and a bit sequence resulting from noise.
2) As an alternative to one-time frequency correction, multiple frequency corrections could be carried out and the data sampled to search for a preamble pattern as in the ADF7023™.
3) Preamble detection could be modified to operate on any data sequence other than 1010.
4) Embodiments of the invention can provide a pre-adjustment of a carrier frequency based on a pre-calculated frequency error derived as described above without necessarily having to repeatedly derive the adjustment from a detected preamble.
5) It will also be appreciated that in some circumstances the output from the slicer 112 might be either a high or low flat-line and in this case, frequency adjustment other than determined according to the above described embodiments might be desired, before the embodiment would be applied. Thus, again more than one frequency correction might be desired before the transmitter and receiver matched.

The systems, apparatus, and methods of preamble detection are described above with reference to certain embodiments. A skilled artisan will, however, appreciate that the principles and advantages of the embodiments can be used for any other systems, apparatus, or methods with a need for preamble detection.

Such systems, apparatus, and/or methods can be implemented in various electronic devices. Examples of the electronic devices can include, but are not limited to, consumer electronic products, parts of the consumer electronic products, electronic test equipment, wireless communications infrastructure, etc. Examples of the electronic devices can also include memory chips, memory modules, circuits of optical networks or other communication networks, and disk driver circuits. The consumer electronic products can include, but are not limited to, measurement instruments, medical devices, wireless devices, a mobile phone (for example, a smart phone), cellular base stations, a telephone, a television, a computer monitor, a computer, a hand-held computer, a tablet computer, a personal digital assistant (PDA), a microwave, a refrigerator, a stereo system, a cassette recorder or player, a DVD player, a CD player, a digital video recorder (DVR), a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic device can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Description of Preferred Embodiments using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

The teachings of the inventions provided herein can be applied to other systems, not necessarily the systems described above. The elements and acts of the various embodiments described above can be combined to provide further embodiments. The act of the methods discussed herein can be performed in any order as appropriate. Moreover, the acts of the methods discussed herein can be performed serially or in parallel, as appropriate.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. Accordingly, the scope of the present inventions is defined by reference to the claims.

What is claimed is:

1. A method for detecting a preamble in a received radio signal, the method comprising:
    demodulating the received radio signal based on a carrier derived from a local timing source to provide a digital signal comprising a sequence of bits oscillating at approximately a modulated data rate;
    determining a bit width of each successive bit of said digital signal;
    responsive to a pair of consecutive bit widths having a combined width within a threshold value, indicating a bit pair as potentially belonging to the preamble;
    responsive to detecting a threshold number of potential preamble bit pairs in a sequence of bit pairs within a given window, indicating said sequence of bit pairs as potentially belonging to the preamble;
    determining a statistical characteristic of at least some of said sequence of bit pairs potentially belonging to the preamble, including determining if a variance of bit widths of the sequence of bit pairs is less than a second threshold amount; and
    responsive to said statistical characteristic meeting a predefined criterion, confirming that said sequence of bit pairs belongs to the preamble.

2. The method of claim 1 further comprising:
    providing a measure of bit widths of at least some bits within a sequence of preamble bit pairs; and
    adjusting a frequency of said local timing source according to said measure.

3. The method of claim 2 wherein said determining of the statistical characteristic and said confirming are performed before said adjusting.

4. The method of claim 2 wherein the adjustment to local timing source is linearly proportional to said measure of bit widths.

5. The method of claim 2 wherein said providing a measure comprises providing the measure of at least some alternate bit widths within said sequence of preamble bit pairs.

6. The method of claim 5 wherein said measure is an average of at least some of said alternate bit widths.

7. The method of claim 1 wherein said method is implemented in a Wireless M-Bus transceiver.

8. The method according to claim 1 wherein said local timing source comprises a fractional-N PLL.

9. The method of claim 1 further comprising:
    sampling said digital signal at a frequency multiple of said modulated data rate derived from said local timing source; and
    determining a bit width of each successive bit of said digital signal as a multiple of said sampling frequency.

10. A method for detecting a preamble in a received radio signal, the method comprising:
    demodulating the received radio signal based on a carrier derived from a local timing source to provide a digital signal comprising a sequence of bits oscillating at approximately a modulated data rate;
    determining a bit width of each successive bit of said digital signal;
    responsive to a pair of consecutive bit widths having a combined width within a threshold value, indicating a bit pair as potentially belonging to the preamble;
    responsive to detecting a threshold number of potential preamble bit pairs in a sequence of bit pairs within a given window, indicating said sequence of bit pairs as potentially belonging to the preamble, wherein said at least some of said sequence of bits bit pairs potentially belonging to the preamble comprises either bits valued one or bits valued zero;
determining a statistical characteristic of at least some of said sequence of bit pairs potentially belonging to the preamble; and
responsive to said statistical characteristic meeting a predefined criterion, confirming that said sequence of bit pairs belongs to the preamble.

11. A method for detecting a preamble in a received radio signal, the method comprising:
demodulating the received radio signal based on a carrier derived from a local timing source to provide a digital signal comprising a sequence of bits oscillating at approximately a modulated data rate;
determining a bit width of each successive bit of said digital signal;
responsive to a pair of consecutive bit widths having a combined width within a threshold value, indicating a bit pair as potentially belonging to the preamble, wherein said threshold value is two nominal bit widths plus or minus a threshold number of sampling frequency bits; and
responsive to detecting a threshold number of potential preamble bit pairs in a sequence of bit pairs within a given window, indicating said sequence of bit pairs as potentially belonging to the preamble.

12. An apparatus comprising:
a local timing source;
a demodulator configured to receive a radio signal based on a carrier derived from said local timing source and provide a digital signal comprising a sequence of bits oscillating at approximately a modulated data rate; and
a preamble detector configured to:
determine a bit width of each successive bit of said digital signal;
responsive to a pair of consecutive bit widths having a combined width within a threshold value, indicate a bit pair as potentially belonging to a preamble;
responsive to detecting a threshold number of potential preamble bit pairs in a sequence of bit pairs within a given window, indicate said sequence of bit pairs as potentially belonging to the preamble;
determining a statistical characteristic of at least some of said sequence of bit pairs potentially belonging to the preamble, including determining if a variance of bit widths of the sequence of bit pairs is less than a second threshold amount; and
responsive to said statistical characteristic meeting a predefined criterion, confirming that said sequence of bit pairs comprises the preamble.

13. The apparatus of claim 12 further comprising a transceiver that includes a radio receiver and a transmitter, the radio receiver and the transmitter both coupled to the local timing source, and the radio receiver comprising the demodulator and the preamble detector.

14. The apparatus of claim 12 further comprising an adaptor configured to interface with a radio receiver comprising said local timing source, the adaptor being configured to receive, from said radio receiver, the digital signal comprising the sequence of bits oscillating at approximately the modulated data rate and derived from the received radio signal based on said local timing source.

15. The apparatus of claim 12, wherein the apparatus comprises a radio receiver, said radio receiver comprising said local timing source, said demodulator, and said preamble detector.

16. An apparatus comprising:
a local timing source
a demodulator configured to receive a radio signal based on a carrier derived from said local timing source and provide a digital signal comprising a sequence of bits oscillating at approximately a modulated data rate; and
a preamble detector configured to:
determine a bit width of each successive bit of said digital signal;
responsive to a pair of consecutive bit widths having a combined width within a threshold value, indicate a bit pair as potentially belonging to a preamble;
responsive to detecting a threshold number of potential preamble bit pairs in a sequence of bit pairs within a given window, indicate said sequence of bit pairs as potentially belonging to the preamble, wherein said at least some of said sequence of bits pairs potentially belonging to the preamble comprises either bits valued one or bits valued zero;
determine a statistical characteristic of at least some of said sequence of bit pairs potentially belonging to the preamble; and
responsive to said statistical characteristic meeting a predefined criterion, confirm that said sequence of bit pairs belongs to the preamble.

17. The apparatus of claim 16, wherein the apparatus is a radio receiver, said radio receiver comprising said local timing source, said demodulator, and said preamble detector.

18. The apparatus of claim 16 further comprising an adaptor configured to interface with a radio receiver comprising said local timing source, the adaptor being configured to receive, from the radio receiver, the digital signal comprising the sequence of bits oscillating at approximately the modulated data rate and derived from the received radio signal based on the local timing source.

19. An apparatus comprising:
a local timing source;
a demodulator configured to receive a radio signal based on a carrier derived from said local timing source and provide a digital signal comprising a sequence of bits oscillating at approximately a modulated data rate; and
a preamble detector configured to:
determine a bit width of each successive bit of said digital signal;
responsive to a pair of consecutive bit widths having a combined width within a threshold value, indicate a bit pair as potentially belonging to the preamble, wherein said threshold value is two nominal bit widths plus or minus a threshold number of sampling frequency bits; and
responsive to detecting a threshold number of potential preamble bit pairs in a sequence of bit pairs within a given window, indicate said sequence of bit pairs as potentially belonging to the preamble.

20. The apparatus of claim 19, wherein the apparatus is a radio receiver, said radio receiver comprising said local timing source, said demodulator, and said preamble detector.

21. The apparatus of claim 19 further comprising an adaptor configured to interface with a radio receiver comprising said local timing source, the adaptor being configured to receive, from the radio receiver, the digital signal comprising the sequence of bits oscillating at approximately the modulated data rate and derived from the received radio signal based on the local timing source.

* * * * *

UNITED STATES PATENT AND TRADEMARK OFFICE
CERTIFICATE OF CORRECTION

| | | |
|---|---|---|
| PATENT NO. | : 9,191,189 B2 | Page 1 of 1 |
| APPLICATION NO. | : 14/085443 | |
| DATED | : November 17, 2015 | |
| INVENTOR(S) | : Michael Dalton | |

It is certified that error appears in the above-identified patent and that said Letters Patent is hereby corrected as shown below:

Title page

In column 1 (page 2, item 56) at line 4, Under Other Publications, change "00K" to --OOK--.

Specification

In column 2 at line 36, Change "invention." to --invention;--.

In column 8 at line 39, After "ADF7021™" insert --.--.

Claims

In column 11 at line 1, In Claim 10, before "bit" delete "bits".

In column 12 at line 18 (approx.), In Claim 16, change "bits" to --bit--.

Signed and Sealed this
Seventh Day of June, 2016

Michelle K. Lee
*Director of the United States Patent and Trademark Office*